United States Patent [19]

Kopacz et al.

[11] Patent Number: 5,443,103
[45] Date of Patent: Aug. 22, 1995

[54] MULTIPLE TASK WOODWORKING APPARATUS

[76] Inventors: Wieslaw Kopacz, 740 Harris St., South Bend, Ind. 46629; Ewa Kopacz; Dominika Kopacz, both of 2400 Andrew Ave., Apt. 223, La Porte, Ind. 46350

[21] Appl. No.: 203,296

[22] Filed: Mar. 1, 1994

[51] Int. Cl.6 .................... B27C 9/00; B27H 1/00
[52] U.S. Cl. .................... 144/3.R; 144/1 R; 144/1 G; 144/286 R; 144/308; 269/229
[58] Field of Search ........... 144/1 R, 1 B, 1 G, 1 J, 144/2 R, 3 R, 20, 138, 198 A, 285, 286 B, 307, 308, 1 C; 269/58, 217, 229

[56] References Cited

U.S. PATENT DOCUMENTS

| | | | |
|---|---|---|---|
| 317,876 | 5/1885 | Stevens | 144/3 R |
| 900,976 | 10/1908 | Bauer | 144/286 R |
| 1,860,071 | 5/1932 | Bodkin | 144/1 R |
| 2,201,134 | 3/1950 | Meckoski et al. | 144/1 R |
| 2,577,206 | 12/1951 | Patterson | 144/1 C |
| 2,619,135 | 11/1952 | Callaway | 144/1 C |
| 2,662,566 | 12/1953 | Kurschner | 144/286 R |
| 2,916,063 | 12/1959 | Boekenkamp | 144/198 A |
| 3,008,501 | 11/1961 | Hammer | 144/1 G |
| 3,734,151 | 5/1973 | Skripsky | 144/1 R |
| 4,899,795 | 2/1990 | Hackett | 144/198 A |

Primary Examiner—W. Donald Bray

[57] ABSTRACT

A woodworking apparatus for performing a plurality of tasks upon a workpiece such as cutting, turning, and routing is disclosed. The apparatus includes a table having a table saw, a lathe, and a pair of routers mounted thereto. The routers are mounted in a spaced and counter-rotating relationship such that both a tongue and groove may be simultaneously formed in the workpiece. The table includes a plurality of transverse journals operable to receive a workholder such as a lathe tailstock or the sliding workpiece clamp disclosed herein. The sliding workpiece clamp of the present invention may be utilized during any operation of the apparatus but is particularly useful to guide the workpiece between the routers to reduce the likelihood of unintentional contact with the router bits.

9 Claims, 4 Drawing Sheets

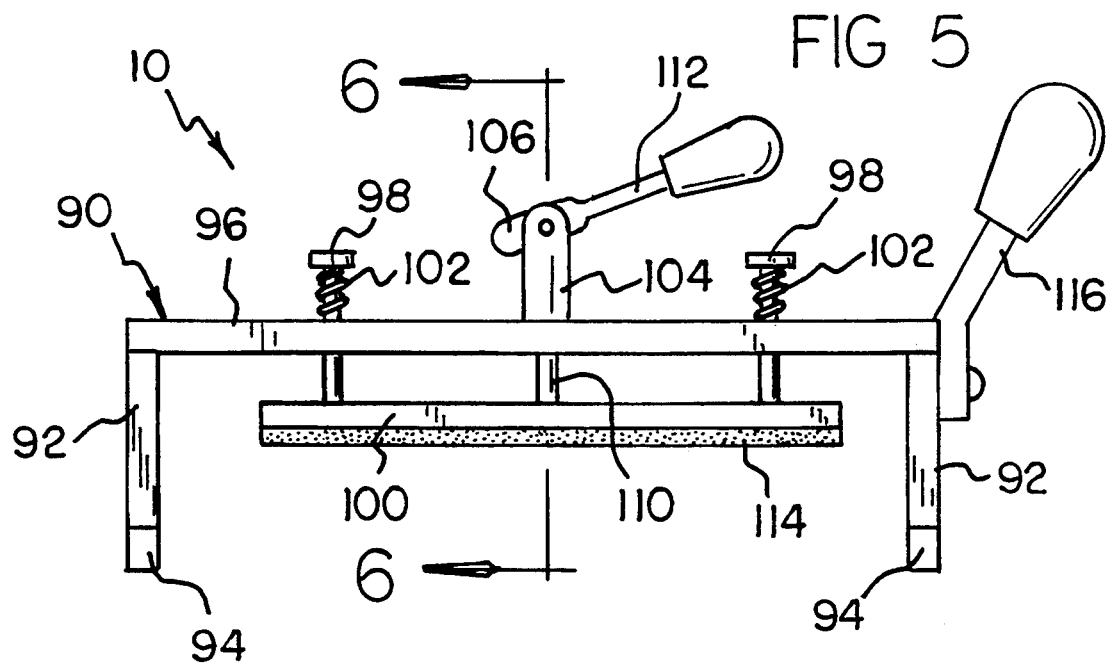
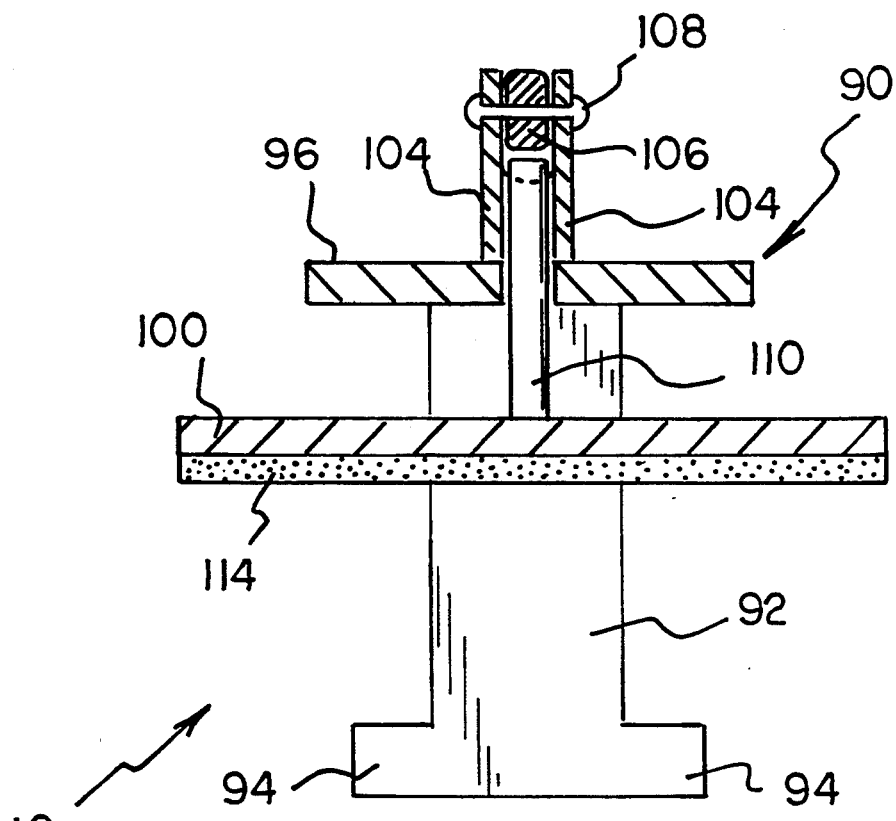

MULTIPLE TASK WOODWORKING APPARATUS

BACKGROUND OF THE INVENTION

1. Field of the Invention

The present invention relates to cutting and shaping devices and more particularly pertains to a multiple task woodworking apparatus for performing a plurality of tasks upon a workpiece such as cutting, turning, and routing.

2. Description of the Prior Art

The use of cutting and shaping devices is known in the prior art. More specifically, cutting and shaping devices heretofore devised are known to consist basically of familiar, expected and obvious structural configurations, notwithstanding the myriad of designs encompassed by the crowded prior art which have been developed for the fulfillment of countless objectives and requirements.

For example, a dado lathe is illustrated in U.S. Pat. No. 5,065,802 which may be utilized with a table saw to perform numerous cutting operations on a piece of wood stock. Using the dado lathe device, a square wood stock can be turned to a round wood stock, spirals and grooves can be cut in the wood stock, the wood stock can be tapered, and beading and reeding can be cut along the length of the wood stock.

A woodworking assembly is disclosed in U.S. Pat. No. 5,020,578 which includes a conventional table saw having a table and a projecting circular saw blade. A stock moving apparatus is associated with the saw table to move a piece of stock material into engagement with the saw blade. Additionally, a pattern apparatus is provided to impart a particular shape in the stock material when the material is passed over the saw blade.

Another patent of interest is U.S. Pat. No. 4,627,772 which teaches a carving attachment for table saws that mounts onto a table saw and provides a carriage for holding a pattern such that a workpiece will be engaged by the circular saw blade to duplicate the pattern configuration.

Other known prior art cutting and shaping devices include U.S. Pat. Nos. 4,899,795 and 3,116,769.

While these devices fulfill their respective, particular objectives and requirements, the aforementioned patents do not disclose a woodworking apparatus for performing a plurality of tasks upon a workpiece such as cutting, turning and routing which includes a table having a table saw, a lathe, and a pair of routers mounted thereto with a plurality of transverse journals operable to receive a workholder such as a lathe tailstock or a sliding workpiece clamp. Furthermore, none of the known prior art cutting and shaping devices teach or suggest a pair of routers mounted in a spaced and counter-rotating relationship such that both a tongue and groove may be simultaneously formed in the workpiece passed therebetween.

In these respects, the multiple task woodworking apparatus according to the present invention substantially departs from the conventional concepts and designs of the prior art, and in so doing provides an apparatus primarily developed for the purpose of performing a plurality of tasks upon a workpiece such as cutting, turning, and routing.

SUMMARY OF THE INVENTION

In view of the foregoing disadvantages inherent in the known types of cutting and shaping devices now present in the prior art, the present invention provides a new multiple task woodworking apparatus construction wherein the same can be utilized for performing a plurality of tasks upon a workpiece, such as cutting, turning, and routing. As such, the general purpose of the present invention, which will be described subsequently in greater detail, is to provide a new multiple task woodworking apparatus which has many of the advantages of the cutting and shaping devices mentioned heretofore and many novel features that result in a multiple task woodworking apparatus which is not anticipated, rendered obvious, suggested, or even implied by any of the prior art cutting and shaping devices, either alone or in any combination thereof.

To attain this, the present invention generally comprises a woodworking apparatus for performing a plurality of tasks upon a workpiece such as cutting, turning, and routing is disclosed. The apparatus includes a table having a table saw, a lathe, and a pair of routers mounted thereto. The routers are mounted in a spaced and counter-rotating relationship such that both a tongue and groove may be simultaneously formed in the workpiece. The table includes a plurality of transverse journals operable to receive a workholder such as a lathe tailstock or the sliding workpiece clamp disclosed herein. The sliding workpiece clamp may be utilized during any operation of the apparatus but is particularly useful to guide the workpiece between the routers to reduce the likelihood of unintentional contact with the router bits.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new multiple task woodworking apparatus which has many of the advantages of the cutting and shaping devices mentioned heretofore and many novel features that result in a multiple task woodworking apparatus which is not anticipated, rendered obvious, suggested, or even implied by any of the prior art cutting and shaping devices, either alone or in any combination thereof.

It is another object of the present invention to provide a new multiple task woodworking apparatus which may be easily and efficiently manufactured and marketed.

It is a further object of the present invention to provide a new multiple task woodworking apparatus which is of a durable and reliable construction.

An even further object of the present invention is to provide a new multiple task woodworking apparatus which is susceptible of a low cost of manufacture with regard to both materials and labor, and which accordingly is then susceptible of low prices of sale to the consuming public, thereby making such multiple task woodworking apparatuses economically available to the buying public.

Still yet another object of the present invention is to provide a new multiple task woodworking apparatus which provides in the apparatuses and methods of the prior art some of the advantages thereof, while simultaneously overcoming some of the disadvantages normally associated therewith.

Still another object of the present invention is to provide a new multiple task woodworking apparatus for performing a plurality of tasks upon a workpiece such as cutting, turning, and routing which includes a table having a table saw, a lathe, and a pair of routers mounted thereto.

Yet another object of the present invention is to provide a new multiple task woodworking apparatus which includes a pair of routers mounted in a spaced and counter-rotating relationship such that both a tongue and groove may be simultaneously formed in a workpiece.

Even still another object of the present invention is to provide a new multiple task woodworking apparatus which includes a table having a plurality of transverse journals operable to receive a workholder such as a lathe tailstock or a sliding workpiece clamp.

Even still yet another object of the present invention is to provide a new multiple task woodworking apparatus which includes a sliding workpiece clamp that may be utilized during any operation of the apparatus but is particularly useful to guide the workpiece between the routers to reduce the likelihood of unintentional contact with the router bits.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a side elevation view of a portion of the present invention.

FIG. 6 is a cross sectional view taken along line 6—6 of FIG. 5.

DESCRIPTION OF THE PREFERRED EMBODIMENT

Figure 1:
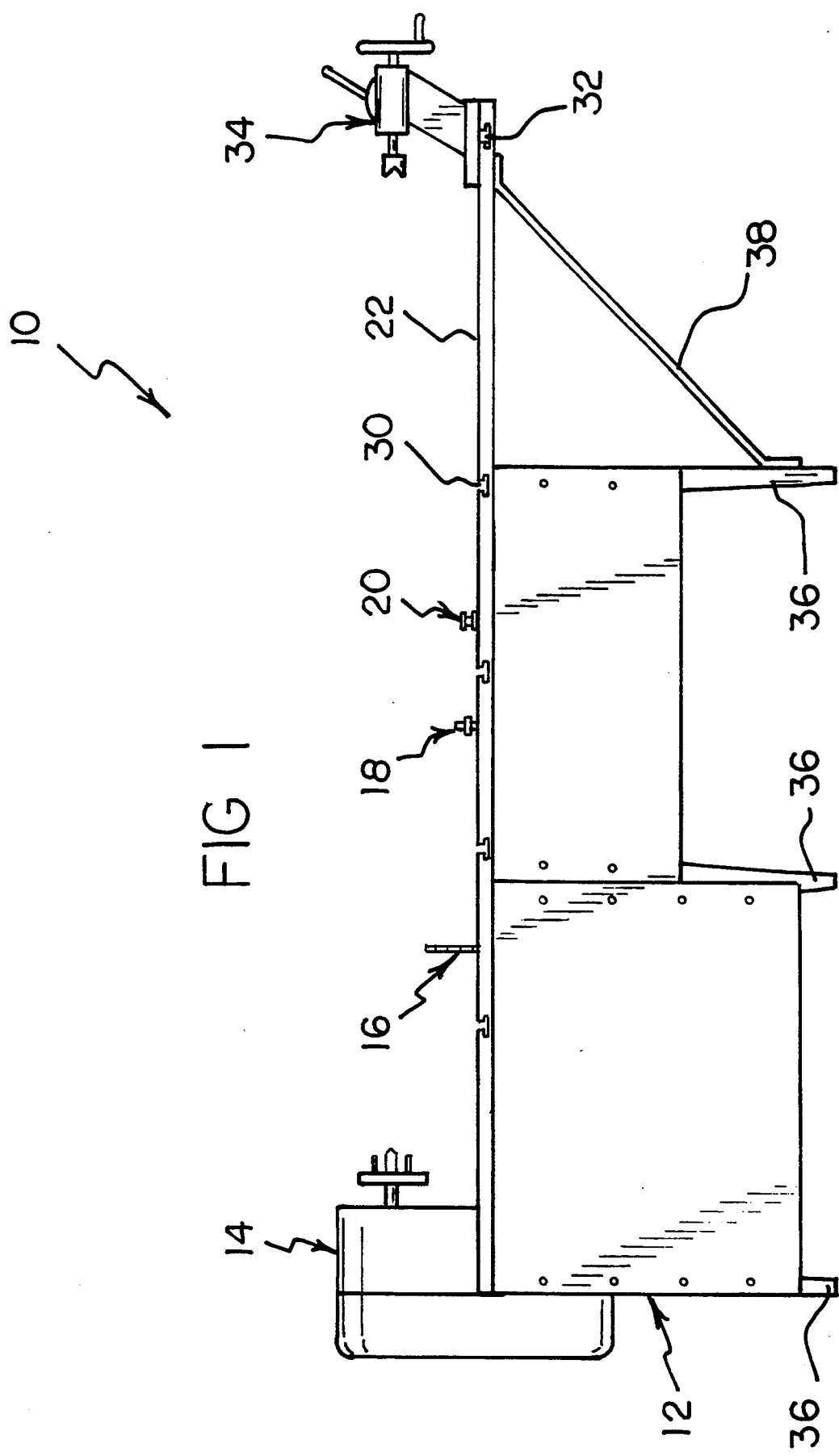
FIG. 1 is a front elevation view of a multiple task woodworking apparatus comprising the present invention.

With reference now to the drawings, and in particular to FIGS. 1-6 thereof, a new multiple task woodworking apparatus embodying the principles and concepts of the present invention and generally designated by the reference numeral 10 will be described.

From an overview standpoint, the multiple task woodworking apparatus 10 comprises a table 12 having a lathe 14, a table saw 16, and a pair of routers 18, 20 mounted thereto. The table 12 includes a tabletop 22 having a plurality of journals 24–32 each operable to receive a workholder, such as a lathe tailstock 34, as best illustrated in FIG. 1.

The routers 18, 20 include a first router 18 operable to form a groove, and a second router 20 operable to form a tongue arranged in a spaced relationship such that both a tongue and groove may be simultaneously formed in a workpiece positioned therebetween. The routers 18, 20 counter-rotate with respect to each other to encourage passage of the workpiece and thus, facilitate a faster and more efficient shaping thereof.

In use, the multiple task woodworking apparatus 10 provides a convenient and compact woodworking station in which repetitive tasks such as the creation of parquet flooring may be efficiently accomplished. The journals 24–32 facilitate both the selective positioning of the lathe tailstock 34 with respect to the lathe 14 and are also operable to receive workholders and positioners.

More specifically, it will be noted that the multiple task woodworking apparatus 10 comprises a table 12 having a substantially rectangularly shaped horizontal tabletop 22 supported upon a plurality of legs 36, as best illustrated in FIG. 1. To conserve valuable floor space, the preferred embodiment includes six legs 36 with a brace 38 supporting a distal end of the tabletop 22.

Figure 2:
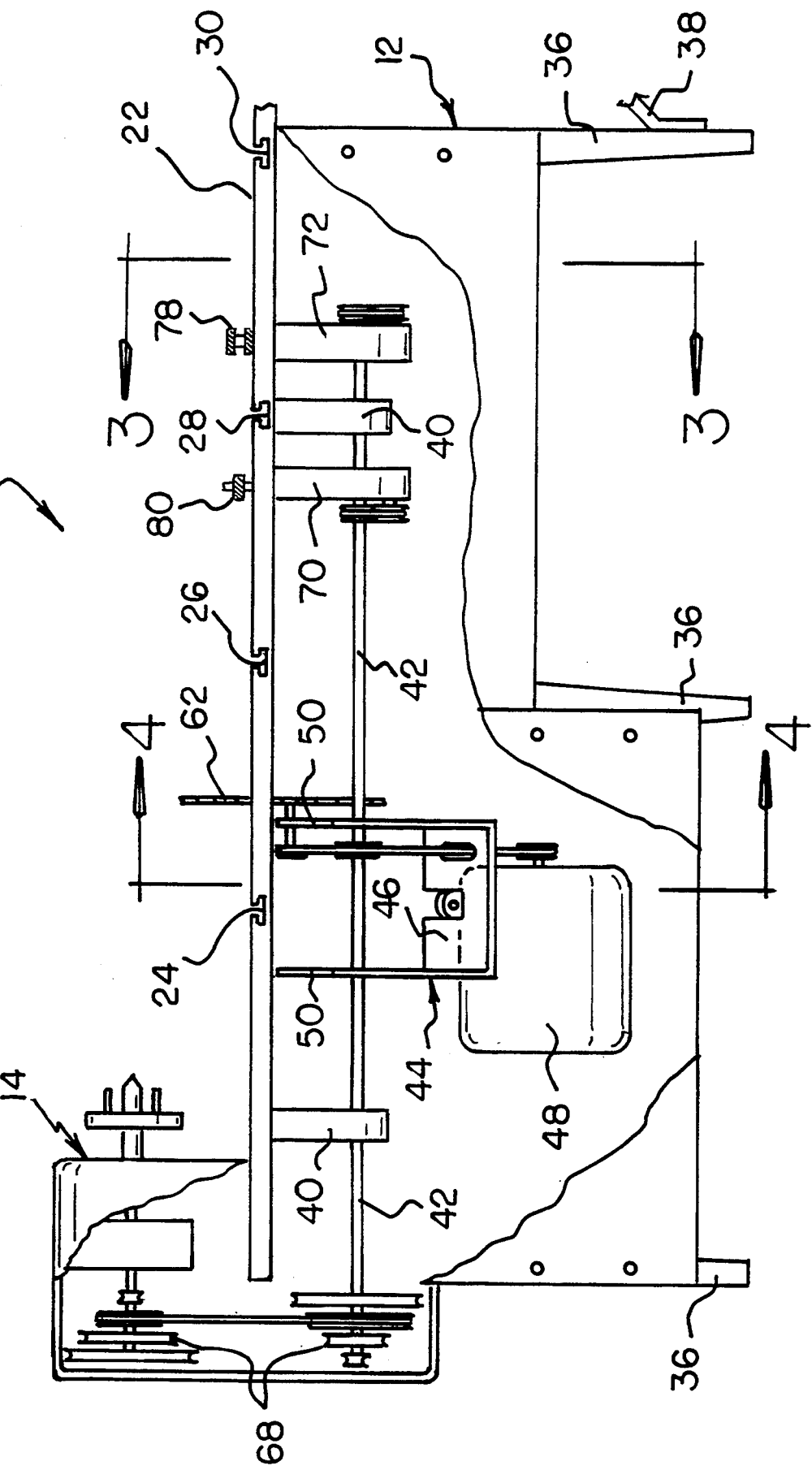
FIG. 2 is a further front elevation view, partially removed, of the present invention.

Mounted beneath and extending downwardly from the tabletop 22 is a pair of shaft supports 40 which rotatably support a main shaft 42 extending longitudinally and horizontally beneath the tabletop. A carriage 44 is pivotally mounted about the main shaft 42 so as to allow a rotational movement of the main shaft and a pivoting of the carriage which will hereinafter be further described. The carriage 44 includes a motor mount 46 to which a motor 48, preferably an electric motor, is secured. A pair of supporting sides 50 are arranged in a spaced, parallel relationship and extend upwardly from the motor mount 46, as best illustrated in FIG. 2. The supporting sides 50 each include through-extending apertures which allow the main shaft 42 to pass therethrough, with each of such apertures being provided with appropriate bearings which allow the shaft to freely rotate.

Figure 4:
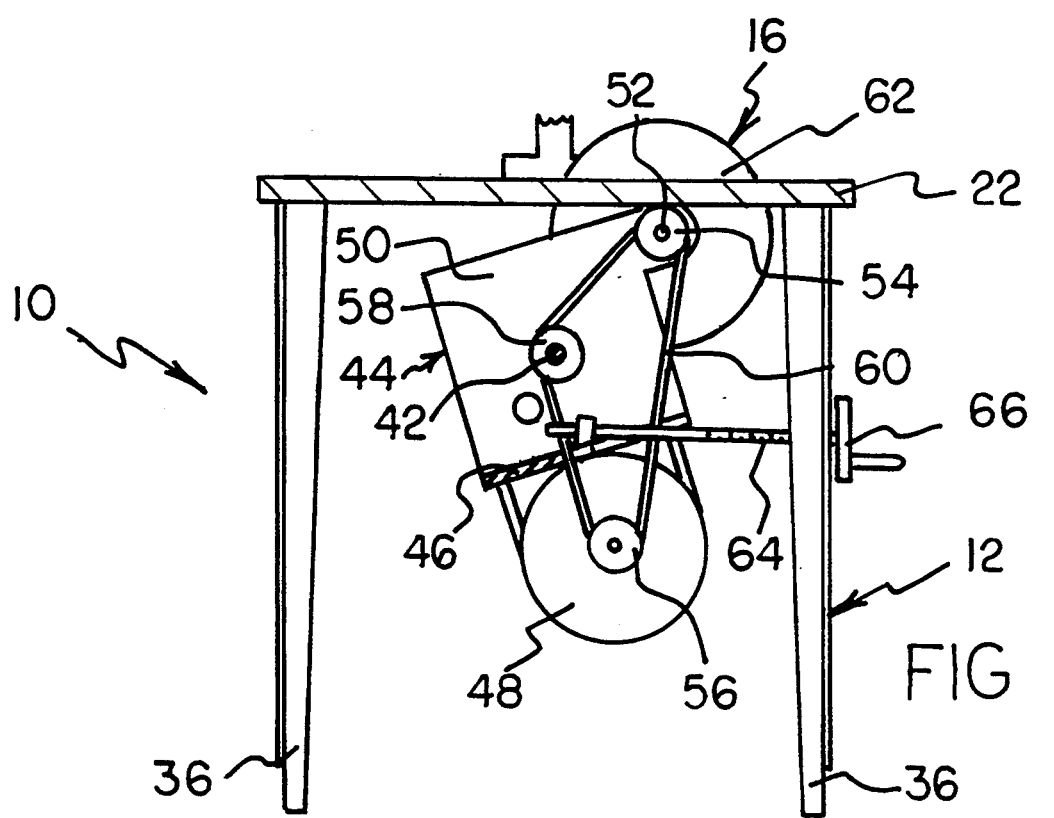
FIG. 4 is a further cross sectional view taken along line 4—4 of FIG. 2.

As best illustrated in FIG. 4, one of the supporting sides 50 of the carriage 44 rotatably supports a saw blade shaft 52 upon which a blade pulley 54 is mounted. Arranged in the same plane as the blade pulley, a motor pulley 56 is mounted to the motor shaft of the motor 48, and a shaft pulley 58 is mounted to the main shaft 42. A saw belt 60 extends around the three pulleys 54, 56, 58 to provide a simultaneous transfer of torque from the motor 48 to both the main shaft 42 and a saw blade 62 mounted to the saw blade shaft 52.

Because the carriage 44 is pivotally mounted about the main shaft 42 and the saw blade shaft 52 is eccentrically mounted with respect to the main shaft, a pivoting of the carriage 44 about the main shaft will raise or lower the saw blade 62 with respect to the tabletop 22. To selectively change and hold such positioning, an adjustment screw 64 is rotatably mounted to a portion of the table 12, and rotatably and advancably mounted to the carriage 44. The threaded adjustment screw 64 is provided with a hand crank 66 such that a rotational movement of the adjustment screw 64 will impart a selective pivoting of the carriage 44 about the main shaft 42, as clearly illustrated in FIG. 4.

The main shaft 42 extends longitudinally beneath the tabletop 22 and provides rotational power to the table saw 16 as described above, as well as a lathe 14 and a pair of routers 18, 20. As best illustrated in FIG. 2, the main shaft 42 extends in a first direction to engage a lathe transmission 68 forming a part of the lathe 14, and extends in a second direction, whereby it is mechanically coupled to a first router gear box 70 forming a part of the first router 18, and a second router box 72 forming a part of the second router 20.

Figure 3:
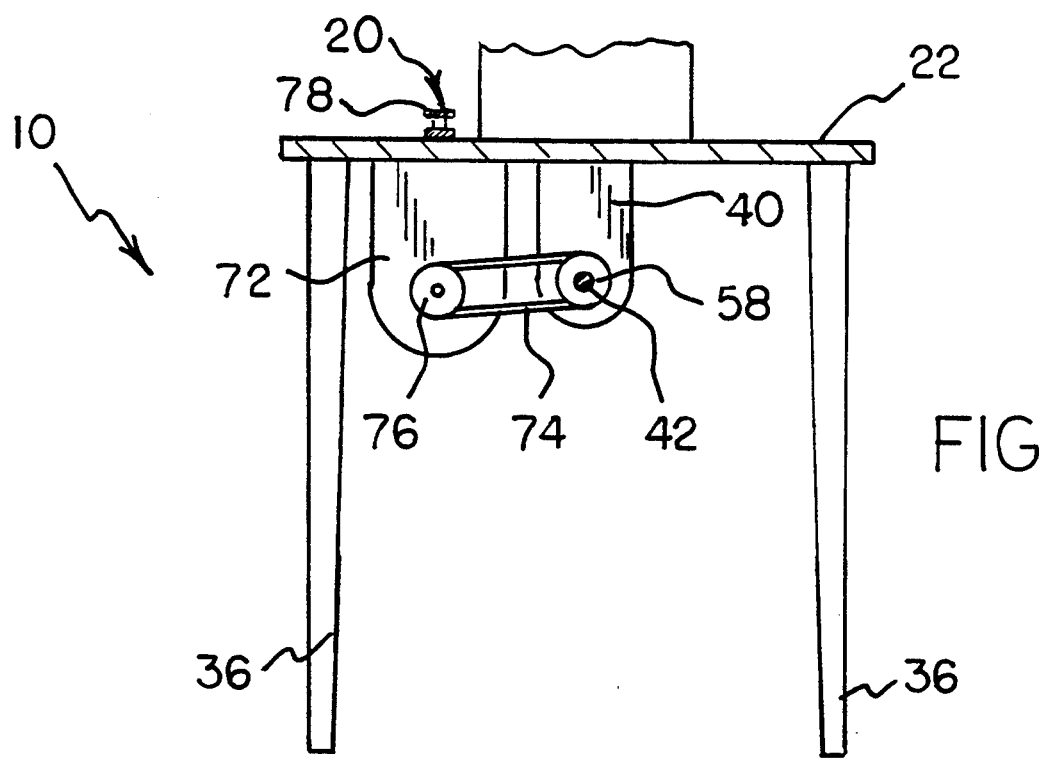
FIG. 3 is a cross sectional view taken along line 3—3 of FIG. 2.

FIG. 3 illustrates the mechanical coupling between the main shaft 42 and second router gear box 72 and it can be seen from this Figure that the main shaft is provided with a further shaft pulley 58 over which a router belt 74 runs. The router belt 74 extends over a router pulley 76 which effectively transfers torque from the main shaft 42 into the conventional components of the router gear box which effect a rotation of the router bit 78 mounted above the tabletop 22. Further, it is to be understood that the mechanical coupling of the first router gear box to the main shaft 42 is substantially similar to the mechanical coupling of the second router gear box 72 to the main shaft as described in detail above.

As best illustrated in FIGS. 1 and 2, the first router 18 is provided with a first router bit 80 which is operable to shape a groove within the edge of a workpiece. The second router 20 is provided with a second router bit 78 which is operable to form a tongue upon a further edge of the workpiece. Because the routers 18, 20 are positioned in a spaced relationship, a workpiece, such as a section of parquet flooring, may be positioned between the routers, whereby a tongue and groove may then be formed upon respectively opposed edges thereof. Although not specifically illustrated, the routers 18, 20 may be slidably mounted to the tabletop 22 such that the distance therebetween may be varied. It is further contemplated that to accomplish such movable mounting, the shaft pulleys 58 around which the router belt 74 runs may be barrel shaped so as to allow an axial movement of the router belt over such barrel shaped pulley.

The tabletop 22 provides a unitary, continuous, flat surface upon which rapid cutting and routing of workpieces may be performed. To facilitate the removable attachment of workholders to the tabletop 22, the tabletop is provided with a plurality of journals 24-32 which allow the slidable placement of such workholders therein. The journals 24-32 extend transversely across the tabletop 22 and include: a pair of saw journals 24, 26 located on respectively opposed sides of the saw blade 62; a router journal 28 extending between the first router 18 and the second router 20; an auxiliary journal 30 spaced from the second router 20 and equal distance with respect to the spacing between the saw journal 26 and the first router 18; and a lathe journal 32 located at a distal end of the tabletop. The journals 24-32 allow the lathe tailstock 34 to be positioned at a variety of distances from the lathe 14. Such arrangement allows the lathe 14 to turn various lengths of wood or other materials which would not be possible without the movable positioning of the tailstock.

The journals 24-32 may receive any conventionally known workholder and may also receive the sliding workpiece clamp 90 illustrated in FIGS. 5 and 6. The sliding workpiece clamp 90 includes a pair of stanchions 92 each provided with respectively opposed projections 94 which allow the stanchions to be positioned within any of the journals 24-32 to preclude an upward removal of the stanchions therefrom. The stanchions 92 are positioned in a parallel, spaced relationship with a bridge 96 extending therebetween. The bridge 96 is arranged to be supported upon the stanchions 92 in a parallel, spaced relationship with respect to the tabletop 22 and is provided with a pair of apertures which permit a respective pair of guide posts 98 to movably project therethrough. The guide posts 98 are operable to movably support a clamp plate 100 with respect to the bridge 96 and each guide post is provided with a spring 102 which biases the clamp plate upward and against the bridge, as best illustrated in FIG. 5.

Positioned over an aperture in the approximate center of the bridge 96 is a pair of spaced, upwardly extending cam supports 104 which support therebetween a cam 106 upon a pivot pin 108. A plunger 110 is mounted to the clamp plate 100 and extends through the centrally located aperture in the bridge 96 to engage the cam 106. The cam 106 is provided with a cam handle 112 which may be utilized to rotate the cam into engagement with the plunger 110, thereby biasing the clamp plate 100 towards the tabletop 22 and into engagement with an unillustrated workpiece positioned therebeneath. The clamp plate 100 is provided with a foam pad 114 which precludes scratching and damaging of the workpiece and enhances the frictional engagement between the clamp plate 100 and the workpiece. The sliding workpiece clamp 90 is provided with a hand grip 116 such that positioning and movement of the clamp may be easily accomplished by a user.

In use, the multiple task woodworking apparatus 10 provides a convenient and compact woodworking station in which repetitive tasks, such as the creation of parquet flooring, may be efficiently accomplished. The journals 24-32 facilitate both the selective positioning of the lathe tailstock 34 with respect to the lathe 14 and are also operable to receive workholders and positioners. Additionally, the sliding workpiece clamp 90 may be engaged to any of the journals 24-32, but is particularly useful when engaged to the router journal 28, whereby an unillustrated workpiece may be captured between the clamp plate 100 and the tabletop 22 and advanced between the routers 18, 20 to reduce the likelihood of unintentional contact between a user's hand and the router bits 80, 78.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new multiple task woodworking apparatus comprising:
   a table having a tabletop supported upon a plurality of legs, said tabletop having at least one journal extending transversely therealong;
   a table saw mounted beneath said tabletop and having a saw blade projecting through said tabletop;
   a first router mounted beneath said tabletop and having a first router bit projecting through said tabletop;
   a second router mounted beneath said tabletop and having a second router bit projecting through said tabletop, said second router bit being spaced from said first router bit; and
   an electric motor connectable to a power source, said electric motor being mechanically coupled to said table saw and said first and second routers.

2. The new multiple task woodworking apparatus of claim 1, and further comprising a lathe positioned on said tabletop and mechanically coupled to said motor; and a lathe tailstock selectively positionable within said at least one journal.

3. The new multiple task woodworking apparatus of claim 2, and further comprising a pair of shaft supports extending downwardly beneath said tabletop, said shaft supports each having a through-extending aperture; a main shaft extending through said apertures in said shaft supports; a plurality of shaft pulleys mounted on said main shaft; a motor pulley mounted on said motor; a blade pulley in mechanical communication with said table saw; and a saw belt, with one of said shaft pulleys, said motor pulley, and said blade pulley all lying in a common plane with said saw belt running thereover to effect rotation of both said main shaft and said table saw, said main shaft being further mechanically coupled to said lathe and said routers.

4. The new multiple task woodworking apparatus of claim 3, wherein said first includes a first router pulley and said second router includes a second router pulley, and further comprising a pair of router belts, with one of said router belts passing over said first router pulley and another of said shaft pulleys, and said another of said router belts passing over said second router pulley and still another of said shaft pulleys.

5. The new multiple task woodworking apparatus of claim 4, wherein said at least one journal comprises a plurality of journals with one of said journals extending between said routers.

6. The new multiple task woodworking apparatus of claim 5, and further comprising a means for adjusting a height of said table saw with respect to said tabletop.

7. The new multiple task woodworking apparatus of claim 6, and further comprising a sliding workpiece clamp removably and slidably positioned partially within one of said journals.

8. The new multiple task woodworking apparatus of claim 7, wherein said sliding workpiece clamp comprises a pair of spaced stanchions, each of said stanchions having respectively opposed projections positionable within one of said journals; a bridge extending between said stanchions, said bridge having a plurality of apertures therethrough; at least one guide post projecting through one of said apertures in said bridge; a clamp plate fixedly secured to said at least one guide post, said clamp plate having a plunger extending through another of said apertures in said bridge; and a cam pivotally mounted to said bridge and selectively engagable to said plunger to effect a movement of said clamp plate with respect to said bridge.

9. The new multiple task woodworking apparatus of claim 8, and further comprising a hand grip secured to said workpiece clamp for pushing said clamp through one of said journals.

* * * * *